(12) United States Patent
Huang et al.

(10) Patent No.: US 10,053,237 B2
(45) Date of Patent: Aug. 21, 2018

(54) TRACK ROLLER FAILURE DETECTION SYSTEMS AND METHODS

(71) Applicant: The Boeing Company, Chicago, IL (US)

(72) Inventors: Sam X. Huang, Seattle, WA (US); Kelly T. Jones, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 15/161,066

(22) Filed: May 20, 2016

(65) Prior Publication Data

US 2017/0334582 A1 Nov. 23, 2017

(51) Int. Cl.
| | |
|---|---|
| *B64C 9/00* | (2006.01) |
| *B64F 5/40* | (2017.01) |
| *B64D 45/00* | (2006.01) |
| *B64F 5/60* | (2017.01) |
| B64C 5/02 | (2006.01) |
| B64C 3/38 | (2006.01) |
| B64C 3/58 | (2006.01) |

(52) U.S. Cl.
CPC .................. *B64F 5/40* (2017.01); *B64C 9/00* (2013.01); *B64D 45/0005* (2013.01); *B64F 5/60* (2017.01); *B64C 3/38* (2013.01); *B64C 3/58* (2013.01); *B64C 5/02* (2013.01); *B64C 2009/005* (2013.01)

(58) Field of Classification Search
CPC .......... B64F 5/40; B64F 5/60; B64D 45/0005; B64C 9/00; B64C 3/58; B64C 3/38; B64C 5/02; B64C 2009/005
See application file for complete search history.

(56) References Cited

U.S. PATENT DOCUMENTS

| | | | | |
|---|---|---|---|---|
| 4,471,928 | A * | 9/1984 | Cole .......................... | B64C 9/00 244/215 |
| 8,424,807 | B2 * | 4/2013 | Sutton ...................... | B29C 43/12 244/123.1 |
| 8,763,953 | B2 | 7/2014 | Sakurai et al. | |
| 2007/0102587 | A1 * | 5/2007 | Jones ........................ | B64C 9/22 244/214 |
| 2009/0127402 | A1 * | 5/2009 | Jaggard ..................... | B64C 9/02 244/213 |
| 2013/0126670 | A1 * | 5/2013 | Vaghela .................. | B64C 13/28 244/99.3 |
| 2016/0083081 | A1 * | 3/2016 | Cowles, Jr. ............... | B64C 9/02 244/99.3 |
| 2016/0297541 | A1 * | 10/2016 | Anderson ............... | F16H 19/04 |

* cited by examiner

*Primary Examiner* — Assres H Woldemaryam
(74) *Attorney, Agent, or Firm* — Haynes and Boone, LLP

(57) ABSTRACT

Systems and methods are provided for a track roller failure detection system. The system may include a main aerodynamic device and a secondary aerodynamic device including a track supported by one or more rollers and a marker. Failure of the one or more rollers may result in the track contacting the marker. Operation of the secondary aerodynamic device when one or more of the rollers have failed may result in the marker leaving a mark and/or a trail on a portion of the main aerodynamic device and/or a portion of the secondary aerodynamic device. Failure of the one or more rollers may then be determined from the mark and/or trail.

20 Claims, 8 Drawing Sheets

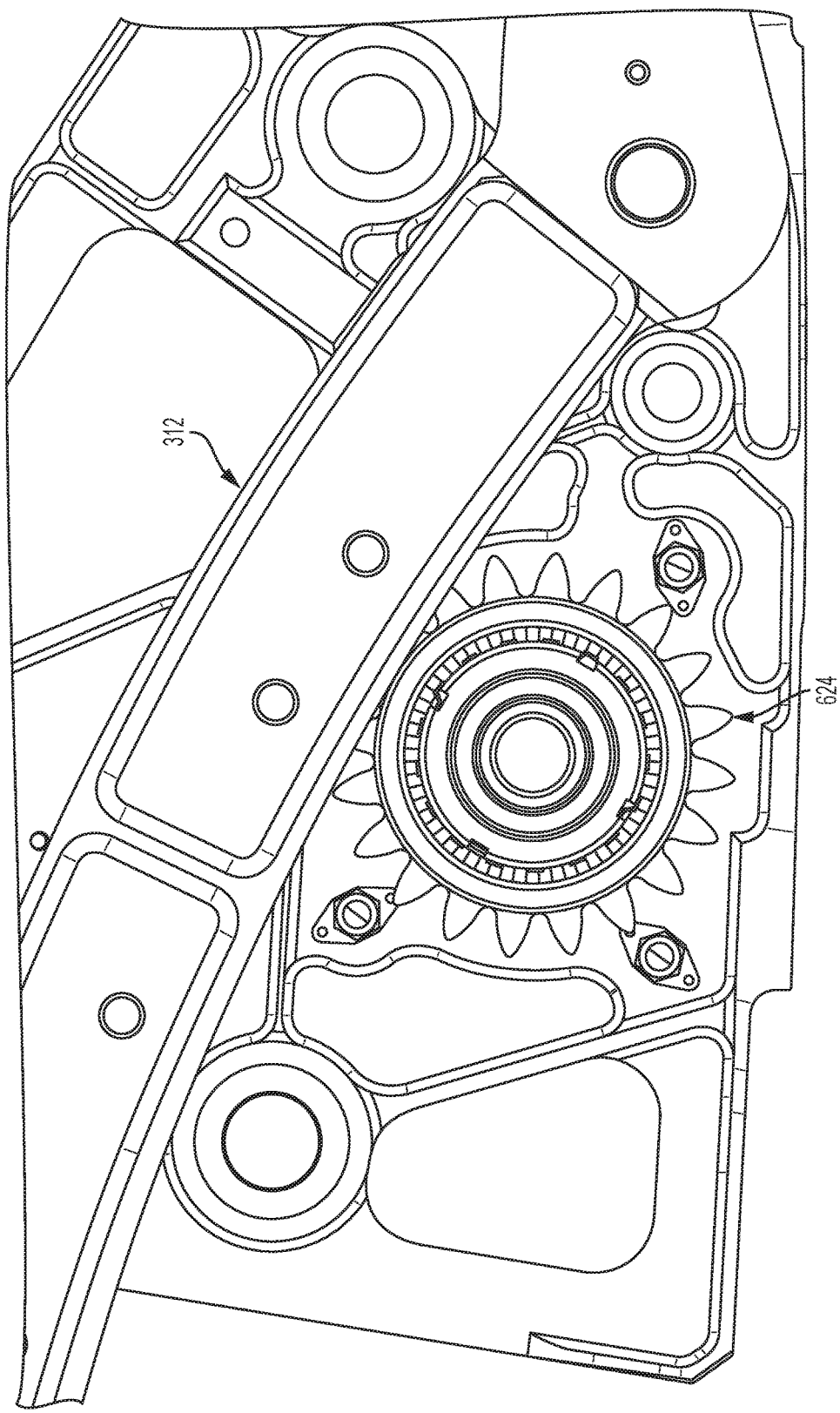

US 10,053,237 B2

TRACK ROLLER FAILURE DETECTION SYSTEMS AND METHODS

TECHNICAL FIELD

The disclosure relates generally to aircraft and more specifically to aircraft aerodynamic devices and to detection of failures of aircraft aerodynamic devices.

BACKGROUND

Certain aerodynamic devices may be actuated via mechanisms that include tracks. The tracks may be supported by and may move on one or more rollers. The rollers may also guide the track to move in a specific path. In certain instances, one or more of the rollers may fail, which may lead to the track moving in a path different from the specific path. In certain examples, the track may contact other components if the track moves on a path different from the specific path with undesirable consequences. Thus, a cost effective technique of detecting roller failures may be desirable.

SUMMARY

Systems and methods are disclosed herein for a track roller failure detection system. In certain examples, an aircraft aerodynamic device may be provided. The aircraft aerodynamic device may include a main aerodynamic body, a secondary aerodynamic body, a roller coupled to the main aerodynamic body, a track connected to the secondary aerodynamic body, configured to be coupled to the roller, and configured to slide by contacting the roller to move the secondary aerodynamic body relative to the main aerodynamic body, and a marker configured mark the track and/or the secondary aerodynamic body responsive to a failure of the roller.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

FIGS. 6A-C illustrate a sequence of operation of a track roller failure detection system in accordance with an example of the disclosure.

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for detecting track roller failures in aerodynamic devices are described in the disclosure herein in accordance with one or more examples. While the aerodynamic device may be any component of a vehicle that may directly or indirectly affect the handling of the vehicle, in certain examples, the aerodynamic devices may be a wing, tail, horizontal stabilizer, or other airfoil of an aircraft. The aerodynamic devices may include, at least, a main aerodynamic device that is fixed in relation to a body or fuselage of the vehicle and a secondary aerodynamic device that may move relative to the main aerodynamic device. In certain examples, the aerodynamic device may include a plurality of secondary aerodynamic devices. The secondary aerodynamic device may be, for example, a slat, a flap, a droop nose, an aileron, a flaperon, an elevator, a rudder, a moveable spoiler, portions of a flexible wing, or another such moveable aerodynamic component.

The secondary aerodynamic device may be mounted on or include one or more tracks. The tracks may be coupled to rollers on the main aerodynamic body and may thus move on the rollers. As such, the secondary aerodynamic body may move between a plurality of positions by rolling the track on the rollers along an intended path. The rollers may support the track and guide the track to move in the direction intended. In certain examples, the track may be located proximate to other components of the aircraft. In certain such examples, failure of one or more of the rollers may lead to the track moving in an unintended direction or moving along an unintended path. Moving along such an unintended path may lead to contact of the track or another portion of the secondary aerodynamic device with such other components of the aircraft. This incidental contact may lead to undesirable consequences, such as a puncture of a fuel tank or damage to nearby transport elements (e.g. electrical wires, hydraulic lines). As such, failure of the rollers should be detected as soon as possible to minimize the risk of damage to the aircraft.

Figure 1:
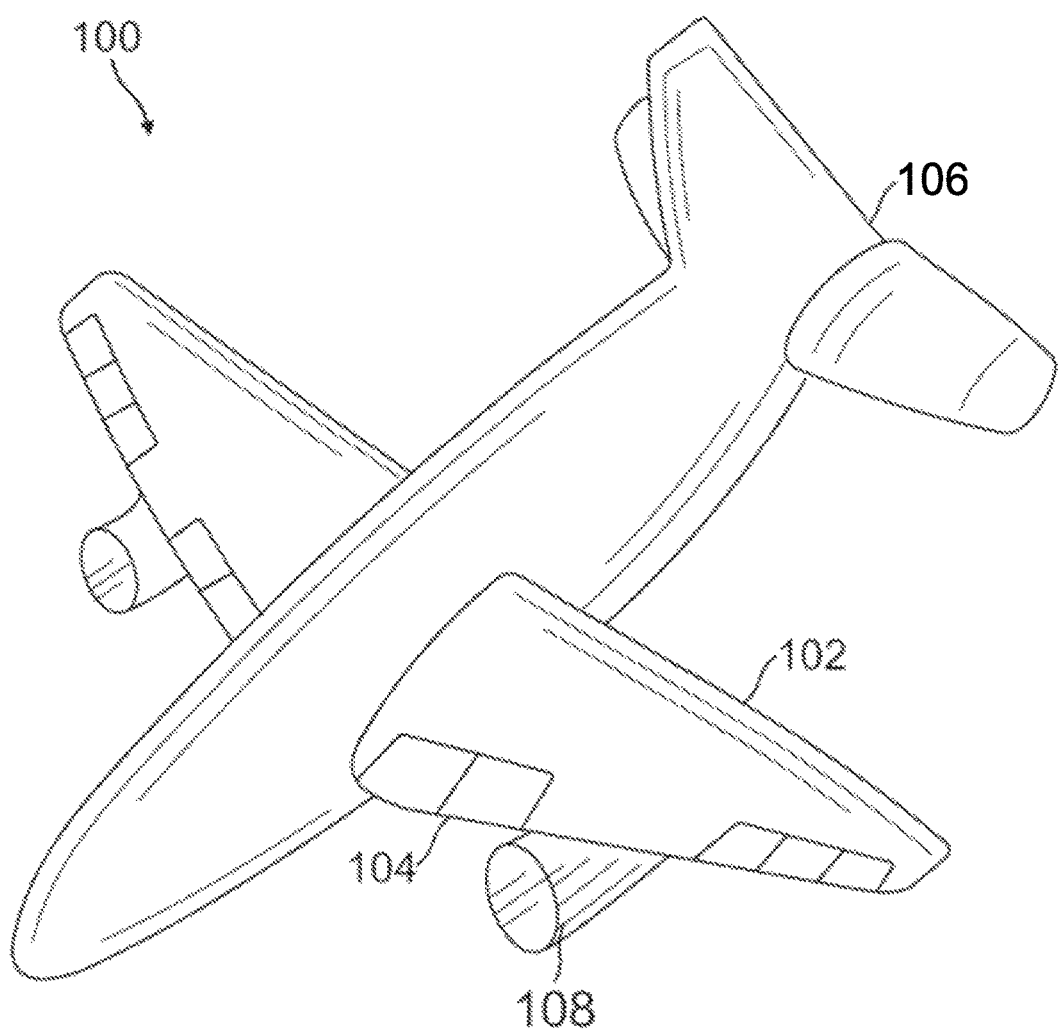
FIG. 1 illustrates a perspective view of an aircraft in accordance with an example of the disclosure.

FIG. 1 illustrates a perspective view of an aircraft in accordance with an example of the disclosure. In FIG. 1, aircraft 100 includes a main aerodynamic device 102, a secondary aerodynamic device 104, a fuselage 106, and a propulsor 108. Though the aircraft 100 shown in FIG. 1 may be a passenger airplane, other examples of the aircraft 100 may include any type of aircraft such as transport planes, helicopters, military aircraft, spacecraft, ground effects vehicles, and other such vehicles.

The propulsor 108 may be any type of aircraft engine. Non-limiting examples of such engines include turbofans, turboprops, and turbojets. An aircraft 100 may have any number of propulsors 108. The fuselage 106 may be any type of aircraft fuselage.

The main aerodynamic device 102 may be any fixed portion of a component of the aircraft 100 that may directly or indirectly affect the handling of the aircraft 100. As such, non-limiting examples of the main aerodynamic device 102 may include a wing, as shown in FIG. 1, a tail, a horizontal stabilizer, and another such control surface. For the purposes of this disclosure, any component that may generate lift, drag, steering force, and/or other such aerodynamic forces may be considered an aerodynamic device. In FIG. 1, the main aerodynamic device 102 may be fixed to the fuselage 106 of the aircraft 100, but other examples may fix the main aerodynamic device 102 to other portions of the aircraft 100.

The secondary aerodynamic device 104 may move relative to the main aerodynamic device 102. As such, the secondary aerodynamic device 104 may be a slat, a flap, a droop nose, an aileron, a flaperon, an elevator, a rudder, a moveable spoiler, portions of a flexible wing, or another such moveable aerodynamic component. The secondary aerodynamic device 104 may be coupled to the main aerodynamic device via one or more tracks mounted on the secondary aerodynamic device 104 and one or more rollers mounted on the main aerodynamic device 102. The track may be supported by the rollers and the secondary aerodynamic device 104 may be positioned/repositioned by moving the track on the rollers. Though FIG. 1 shows an example of an aircraft 100 with five secondary aerodynamic devices 104 per main aerodynamic device 102, other examples of the aircraft 100 may include any number of secondary aerodynamic devices 104 per main aerodynamic device 102.

Figure 2:
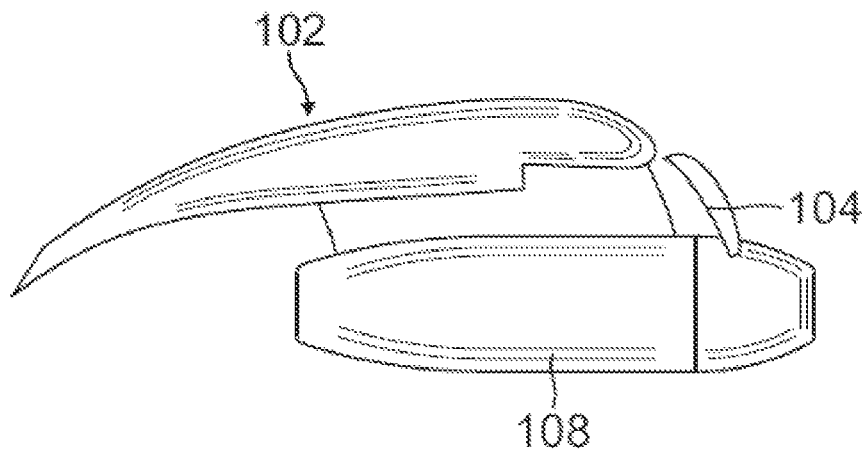
FIG. 2 illustrates a side view of an aircraft aerodynamic device with an aircraft propulsor in accordance with an example of the disclosure.

FIG. 2 illustrates a side view of an aircraft aerodynamic device with an aircraft propulsor in accordance with an example of the disclosure. FIG. 2 includes a main aerodynamic device 102, a secondary aerodynamic device 104, and a propulsor 108. The secondary aerodynamic device 104 may be a slat, a flap, or another aerodynamic device that may move relative to the main aerodynamic device 102.

The secondary aerodynamic device 104 may move between a plurality of positions. The positions may include a retracted position and a deployed position, as well as other positions. The retracted position may be, for example, a normal operational position for when the aircraft 100 may be cruising. In the deployed position, the secondary aerodynamic device 104 may contribute to generating additional lift and/or drag (as compared to the lift and/or drag generated in the retracted position) by the main aerodynamic device 102 and/or the secondary aerodynamic device 104. As such, the secondary aerodynamic device 104 may be in the deployed position during, for example, take-off, landing, low-speed maneuvering, or other situations where higher lift or drag may be desirable.

The secondary aerodynamic device 104 may move between the plurality of positions by moving the track on the rollers. In certain examples, the rollers may drive the track (e.g., the rollers may rotate and transfer such motion to the track to move the track), the track may be driven by a secondary mechanism such as an actuator and/or motor coupled to or attached to the track, or the track may be driven in another manner.

In FIG. 2, the secondary aerodynamic device 104 may be shown to be in a deployed position. The secondary aerodynamic device 104 may be, for example, a slat, and the secondary aerodynamic device 104 may be retracted to be flush with a surface of the main aerodynamic device 102 when in the retracted position. The secondary aerodynamic device 104 may then extend to the deployed position from the retracted position.

Figure 3:
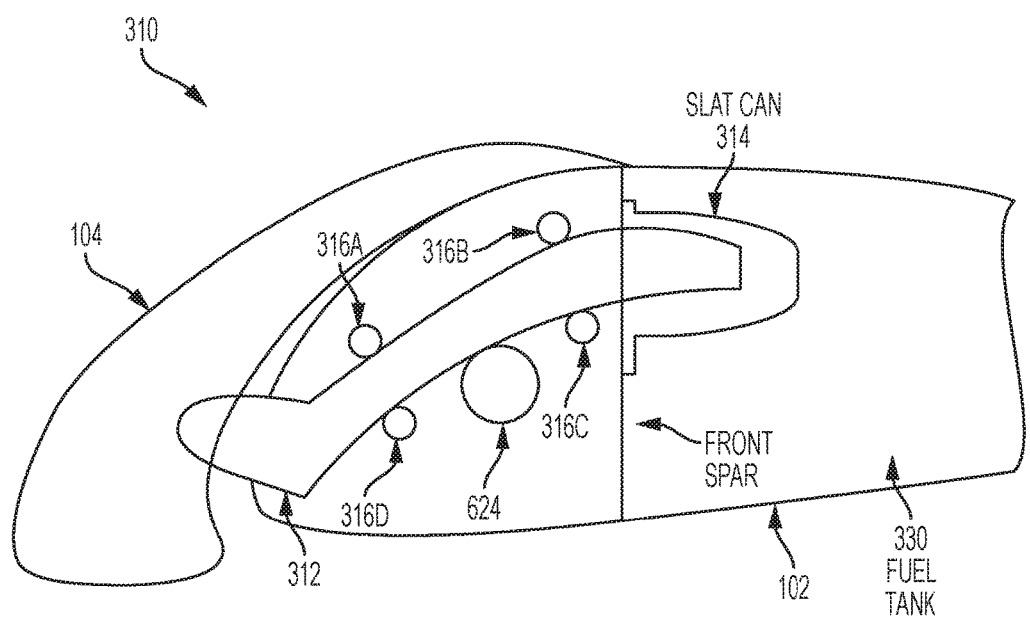
FIG. 3 illustrates a side cutaway view of a portion of an aircraft aerodynamic device in accordance with an example of the disclosure.

The mechanisms to move the secondary aerodynamic device 104 may be illustrated in further detail in FIG. 3. FIG. 3 illustrates a side cutaway view of a portion of an aircraft aerodynamic device in accordance with an example of the disclosure. The aircraft aerodynamic device 310 of FIG. 3 may include portions of the main aerodynamic device 102 and the secondary aerodynamic device 104.

In FIG. 3, the secondary aerodynamic device 104 may be coupled to the track 312. Movement of the track 312 may also move the secondary aerodynamic device 104. The track 312 may also be coupled to rollers. In FIG. 3, the track 312 may be coupled to four rollers, rollers 316A-D. The rollers 316A-D may be arranged such that, if the rollers 316A-D are fully functional, the track 312 may be limited to moving along one path. As such, the rollers 316A-D may be positioned to constrain the track 312 along the path.

In FIG. 3, the position of the rollers 316A-D may form a quadrilateral around the track 312. The roller 316A may be an upper forward point of the quadrilateral, the roller 316B may be an upper rearward point of the quadrilateral, the roller 316C may be a lower rearward point of the quadrilateral, and the roller 316D may be a lower forward point of the quadrilateral. In such a configuration, the track 312 may be constrained to move along a single path. While FIG. 3 may include four rollers 316A-D, other examples may include different numbers of rollers (e.g., 1-3 or 5 or more rollers) and/or may include rollers in combination with components such as slides, railings, and other such components.

Components of the main aerodynamic device 102 and/or the secondary aerodynamic device 104, including, for example, fuel tank 330, may be located next to the track 312 and/or the path that the track 312 is configured to travel on. The components may be located such that, if the track 312 travels along the path is it constrained by the rollers 316A-D to move along, there would be no contact of the components with the track 312. The components may, for example, include wall(s) of the main aerodynamic device and/or the secondary aerodynamic device. Slat can 314 may be such a wall. The slat can 314 may be a wall, a portion of a wall, and/or coupled or attached to a portion of ushc a wall (such as a portion of a front spar of the main aerodynamic device 102) that defines or defines a part of a fuel tank, such as the fuel tank 330. The slat can 314 may protrude into the fuel tank 330. The slat can 314 may, for example, define a space that may house a portion of the track 312 (e.g., house the portion when the track 312 is in the retracted position). Additionally, the components may also include hydraulic, fuel or electrical lines. In certain examples, the walls may separate the path of the track 312 from other portions of the main aerodynamic device 102 and/or the secondary aerodynamic device 104. For example, the track 312 and the path of the track 312 may be on one side of the slat can 314 while the other side of the slat can 314 may include, for example, the fuel tank 330. In such an example, if one or more of the rollers 316A-D fail, the track 312 may move along a path different from the intended path and may, for example, contact the slat can 314. In certain such situations, such contact may puncture the slat can 314. Quick or early detection of roller failures may prevent damage to the walls, such as the slat can 314, as well as other components of the main aerodynamic device 102 and/or secondary aerodynamic device 104 resulting from the track 312 traveling off of its intended path.

FIG. 3 may illustrate the secondary aerodynamic device 104 in a fully retracted position. As such, an end of the track 312 (e.g., the end of the track 312 closest to the right hand side of FIG. 3) may be positioned close to a portion of the slat can 314. In certain such examples, failure of one or more of the rollers 316A-D may result in contact of the end of the track 312 with the slat can 314.

Figure 4:
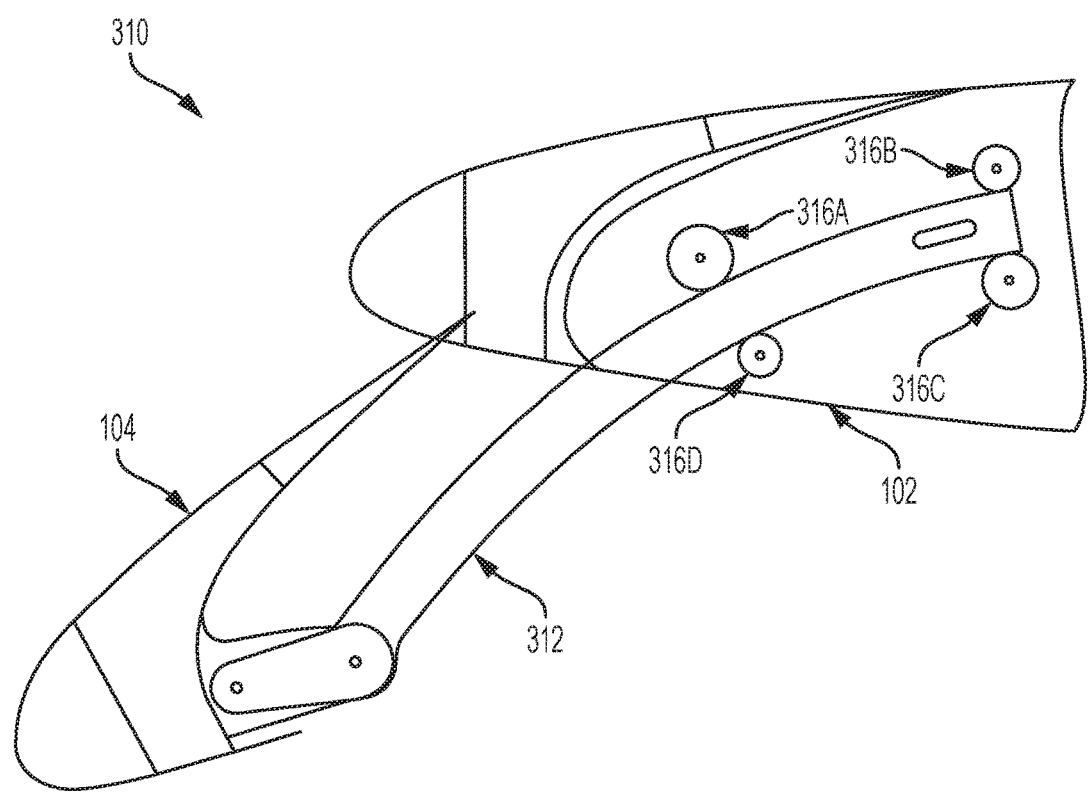
FIG. 4 illustrates another side cutaway view of an aircraft aerodynamic device in accordance with an example of the disclosure.

FIG. 4 illustrates another side cutaway view of an aircraft aerodynamic device in accordance with an example of the disclosure. While FIG. 3 may illustrate the secondary aerodynamic device 104 in a retracted position, FIG. 4 may illustrate the secondary aerodynamic device 104 in a deployed position.

In FIG. 4, the track 312 may be extended such that the secondary aerodynamic device 104 is fully deployed. As such, the track 312 may be extended outward and so the end of the track 312 may be positioned farther from the slat can 314 in FIG. 3 and/or another wall or component. In certain other examples, the track 312, in the fully extended position, may still be close to a portion of the slat can 314, and/or another wall or component. In certain examples, failure of one or more of the rollers 316A-D may result in improper positioning of the secondary aerodynamic device 104 when in the deployed position.

Figure 5:
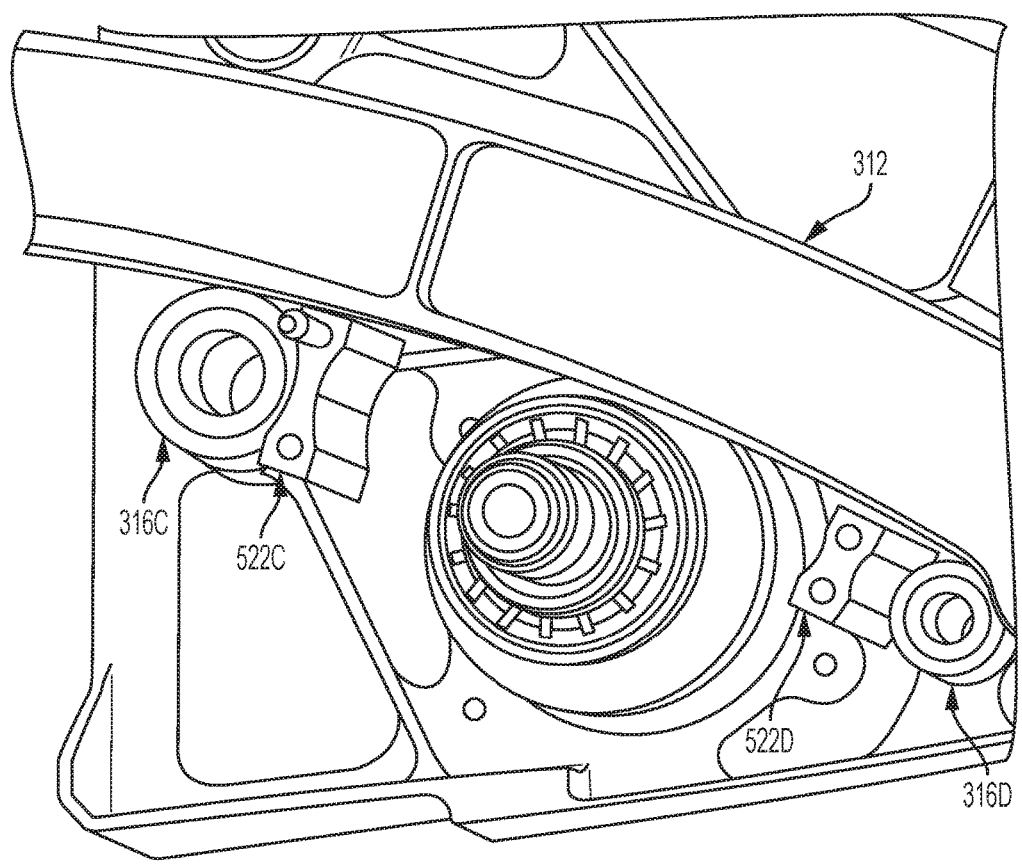
FIG. 5 illustrates a view of a track roller failure detection system in accordance with an example of the disclosure.

FIG. 5 illustrates a view of a track roller failure detection system in accordance with an example of the disclosure. FIG. 5 includes the track 312, the rollers 316C and 316D, and markers 522C and 522D. The track 312 may roll on and/or may be guided by, at least, the rollers 316C and 316D. The markers 522C and 522D may be elements separate from the rollers 316C and 316D and may be positioned such that, if all rollers of the main aerodynamic device 102 and/or the secondary aerodynamic device 104 are functional, the track 312 may move without contacting the markers 522C and 522D. However, if one or more of the rollers (such as one or more of the rollers 316C and 316D) fail (e.g., may disintegrate and/or cease supporting the track 312), one or more of the markers (such as one or more of the markers 522C and 522D) may contact the track 312 and/or another portion of the main aerodynamic device 102 and/or the secondary aerodynamic device 104 and may leave a mark on the track 312. The mark may then be detected during, for example, normal servicing of the aircraft 100. Upon detection of the mark, it may then be determined that one or more rollers have failed.

In certain embodiments, if one of the rollers for the track 312 fails, one or more of the others rollers and/or the markers, as well as other components (e.g., another roller common to a pinion or shaft that the failed roller is mounted on), may form a secondary load element for the track 312 and support at least a portion of the track 312 in lieu of the failed roller. As such, upon failure of the roller, the track 312 may be supported by the secondary load element and travel along the specific intended path or a path substantially similar to the intended path to prevent contact of the track 312 with other portions of the main aerodynamic device 102 and/or the secondary aerodynamic device 104. The marker may, thus, mark the track 312 or another portion of the main aerodynamic device 102 and/or the secondary aerodynamic device 104 to indicate failure of the roller, that the secondary load element has been engaged, and alert maintenance crews to replace the failed roller before failure of the secondary load element.

In certain examples, one or more of the markers may be a soapstone marker, a synthetic welding marker, and/or a paint crayon. Additionally, the track 312 and/or another portion of the main aerodynamic device 102 and/or secondary aerodynamic device 104 may include a coating and the marker may include a compound that may react with the coating when applied to the coating. Thus, contact of the marker with the track 312 may cause such a reaction that may show a visible indication of contact of the marker with the track 312 and/or another portion of the main aerodynamic device 102 and/or secondary aerodynamic device 104.

Additionally or alternatively, the marker may be an electrical connection. Contact between the marker and the track 312 may open an electrical circuit. Alternatively, a circuit may be embedded within, for example, one or more of the markers 522C and 522D. Failure of one or more of the rollers 316C and 316D may result in the track 312 wearing away a top layer of one or more of the markers 522C and 522D to create an open electrical circuit. A controller may detect the opening of the electrical circuit and determine, due to the opening of the electrical circuit, the failure of the roller.

In certain examples, the one or more markers may be embedded, bonded, and/or permanently coupled to a portion of the main aerodynamic device 102 and/or the secondary aerodynamic device 104. As such, the one or more markers may be screwed on or attached via fasteners (e.g., screws, rivets, bolts, nuts, springs, clips, and/or other mechanical fastening techniques), welded and/or bonded (e.g., through adhesives), and/or may be a permanent part (e.g., an entire components may be the marker) of the main aerodynamic device 102 and/or the secondary aerodynamic device 104. In certain such examples, the one or more markers may be periodically replaced (e.g., an old marker may be decoupled and a new marker may be coupled to the main aerodynamic device 102 and/or the secondary aerodynamic device 104).

Figure 6B:
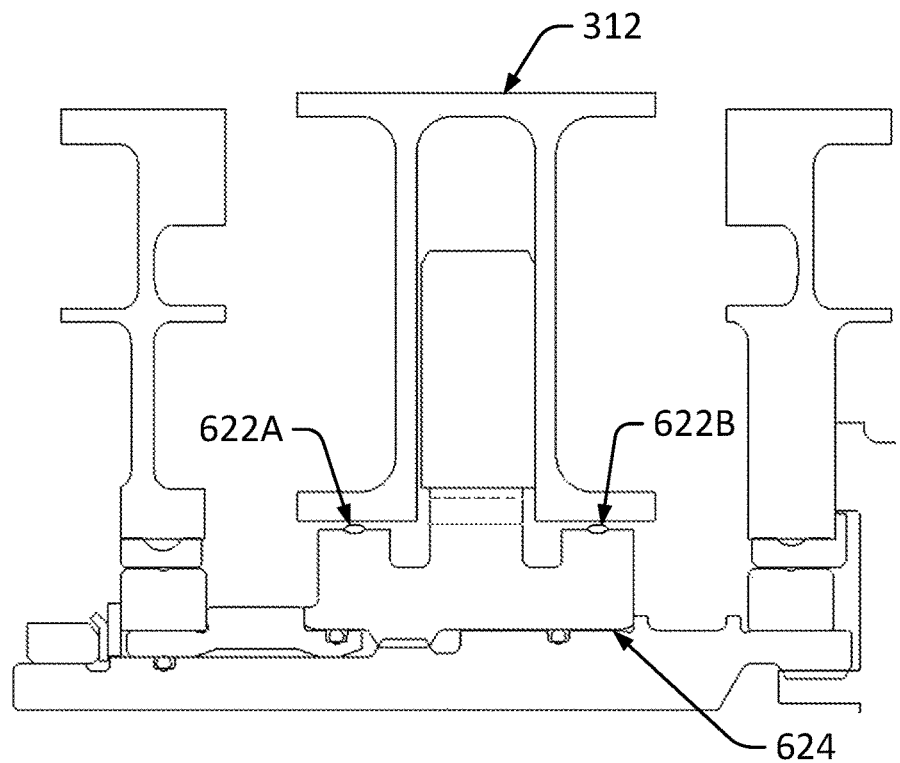
Figure 6C:
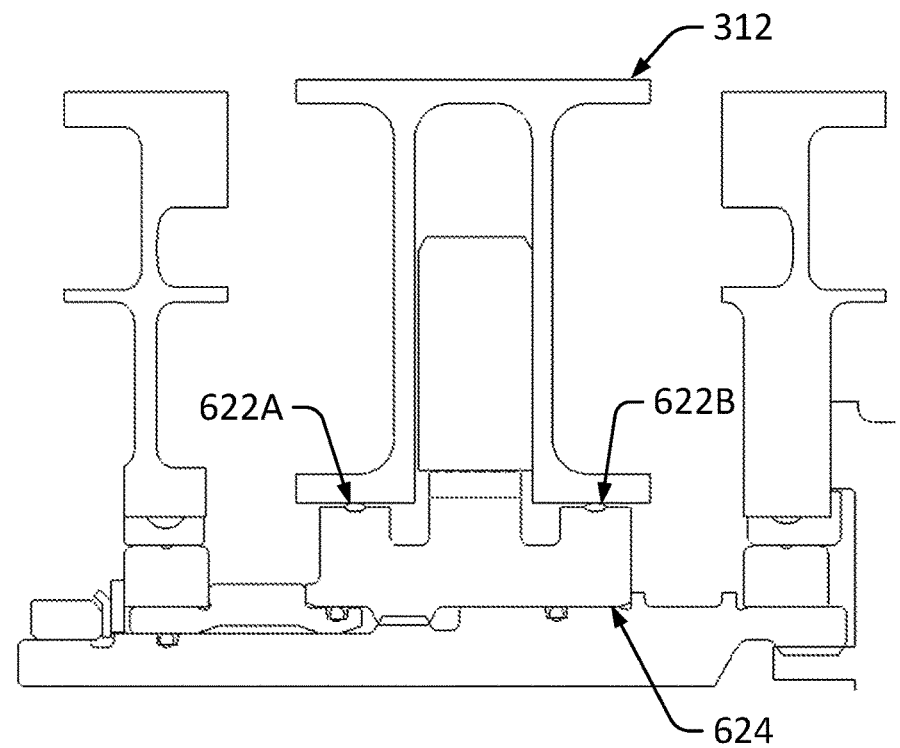

FIGS. 6A-C illustrate a sequence of operation of a track roller failure detection system in accordance with an example of the disclosure. The example shown in FIGS. 6A-C may illustrate an alternative track roller failure detection system to that of the example shown in FIG. 5. As shown in FIGS. 6A-C, one portion of the track 312 may be driven by a pinion assembly 624. The pinion assembly 624 may, in certain examples, include at least a pinion shaft and a pinion gear. The pinion assembly 624 may move or help move the track 312.

In FIG. 6B, the rollers supporting the track 312 may be fully functional and may thus support the track 312. As such, the track 312 may not contact the markers 622A-B. Accordingly, the track 312 may not be marked by the markers 622A-B. In certain examples, the markers 622A-B may be coupled to the pinion gear of the pinion assembly 624 while other examples may couple the markers 622A-B to the pinion shaft and/or another component of the pinion assembly 624.

In FIG. 6C, the rollers supporting the track 312 may have failed. As such, the track 312 may contact the markers 622A and/or 622B. In certain examples, the pinion assembly 624 may drive and move the track 312 and, upon such movement, the markers 622A and/or 622B may leave, for example, a trail (e.g., a line) on the track 312. In certain such examples, failure of one or more of the rollers may result in the pinion assembly 624 supporting at least a portion of the weight of the track 312 to prevent contact of the track 312 with other components.

In certain embodiments, multiple markers may be configured to mark the track 312 to indicate severity of the failure. As such, for example, there may be a red, a blue, and a green marker. Substantial wear of the roller 316 and/or the pinion assembly 624 may result in the track 312 contacting the red marker, but a red marker may not indicate a high likelihood of contact with other components of the main aerodynamic device and/or a secondary aerodynamic device. Partial failure (e.g., failure of a spring supporting the roller) of the roller 316 and/or the pinion assembly 624 may result in the track 312 contacting both the red and the blue marker (e.g., the red marker may deflect due to, for example, compressibility of the marker material and/or a spring mounted component). Full failure (e.g., failure of the roller wheel itself) of the roller 316 and/or the pinion assembly 624 may result in the track 312 contacting all three of the red, blue, and green markers.

Figure 7:
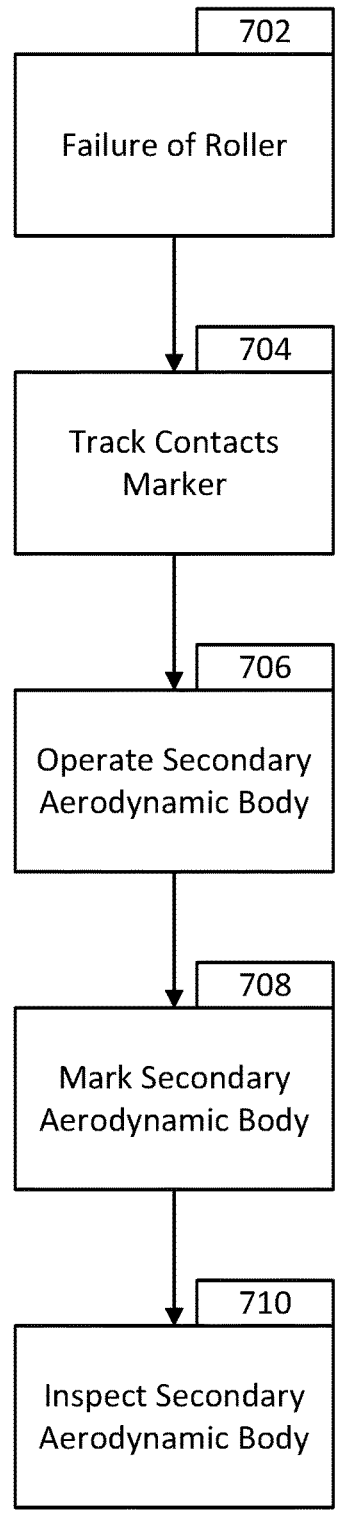
FIG. 7 is a flowchart detailing operation of a track roller failure detection system in accordance with an example of the disclosure.

FIG. 7 is a flowchart detailing operation of a track roller failure detection system in accordance with an example of the disclosure. The process may start in block 702, where failure of a roller supporting the track may occur. In block 704, failure of the roller may result in the track contacting the marker.

In block 706, the secondary aerodynamic device may be operated. Operation of the secondary aerodynamic device may result in marking of the secondary aerodynamic device (e.g., marking of the track or another portion of the secondary aerodynamic device) by the marker (e.g., by the marker leaving a trail) in block 708. Upon landing, the secondary aerodynamic device may be inspected and the mark (e.g., trail) left by the marker may be noted in block 710. As such, failure of the one or more rollers may be determined from the mark (e.g., trail) left by the marker in block 710. Replacement of the one or more rollers may thus be performed. In certain examples, further to determining the failure of one or more of the rollers, a further operation may be performed to determine which of the one or more rollers have failed.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft aerodynamic device comprising:
a main aerodynamic body;
a secondary aerodynamic body;
a roller coupled to the main aerodynamic body;
a track connected to the secondary aerodynamic body, configured to be coupled to the roller, and configured to slide by contacting the roller to move the secondary aerodynamic body relative to the main aerodynamic body; and
a marker configured to indicate a failure of the roller, wherein the marker comprises at least one of:
soapstone, synthetic welding marker, and/or paint crayon configured to mark the track responsive to the failure of the roller;
a compound configured to react with a coating of the track, the track comprising the coating; or
an electrical apparatus configured to form a circuit responsive to the failure of the roller.

2. The aircraft aerodynamic device of claim 1, further comprising a plurality of markers, each marker configured to indicate a failure of the roller for an associated failure mode, wherein the markers comprise the soapstone, the synthetic welding marker, and/or the paint crayon.

3. The aircraft aerodynamic device of claim 2, wherein the aircraft aerodynamic device comprises at least a first marker and a second marker and wherein the first marker and the second marker are disposed on opposite sides of the track.

4. The aircraft aerodynamic device of claim 3, wherein the first marker is disposed below the track and the second marker is disposed above the track.

5. The aircraft aerodynamic device of claim 1, wherein the track comprises the coating, wherein the markers comprise the compound configured to react with the coating of the track, and wherein the aircraft aerodynamic device comprises a plurality of rollers.

6. The aircraft aerodynamic device of claim 5, wherein the aircraft aerodynamic device comprises at least three rollers, each configured to be coupled to the track to allow the track to move along a first path.

7. The aircraft aerodynamic device of claim 1, wherein the secondary aerodynamic body comprises a slat and the track comprises a slat track, a flap, and/or a droop nose.

8. The aircraft aerodynamic device of claim 1, further comprises a secondary load element configured to support the track responsive to the failure of the roller, wherein the marker comprises the electrical apparatus configured to form the circuit responsive to the failure of the roller.

9. The aircraft aerodynamic device of claim 1, wherein the marker is further configured to support the track responsive to the failure of the roller.

10. The aircraft aerodynamic device of claim 1, wherein the track comprises a first section configured to slide by contacting the roller and a second section configured to be marked responsive to the track decoupling from the roller.

11. The aircraft aerodynamic device of claim 1, wherein the marker is configured to mark the track and/or the secondary aerodynamic body responsive to a failure of the roller.

12. The aircraft aerodynamic device of claim 1, wherein the marker is an embedded marker and/or a bonded marker.

13. The aircraft aerodynamic device of claim 1, wherein the track comprises a first end and a second end and the aircraft aerodynamic device further comprises a fuel tank disposed behind the first end.

14. An aircraft comprising the aircraft aerodynamic device of claim 1, wherein the aircraft comprises:
a fuselage;
the aerodynamic device coupled to the fuselage; and
an aircraft propulsor coupled to the aerodynamic device and/or the fuselage.

15. A method of operating the aircraft aerodynamic device of claim 1, the method comprising:
moving the secondary aerodynamic body by sliding the track on the roller; and
indicating the failure of the roller with the marker.

16. The method of claim 15, wherein the track and/or the secondary aerodynamic body is marked by the marker responsive to the failure of the roller.

17. A method of manufacturing the aircraft aerodynamic device of claim 1, the method comprising:
coupling the roller to the main aerodynamic body;
coupling the secondary aerodynamic body to the roller via coupling the track to the roller; and
coupling the marker to the main aerodynamic body.

18. The method of claim 15, wherein the secondary aerodynamic body contacts the marker responsive to failure of the roller.

19. An aircraft aerodynamic device comprising: a main aerodynamic body; a secondary aerodynamic body; a roller coupled to the main aerodynamic body; a track connected to the secondary aerodynamic body, configured to be coupled to the roller, and configured to slide by contacting the roller to move the secondary aerodynamic body relative to the main aerodynamic body; and a marker configured to indicate a failure of the roller, the marker comprising soapstone, synthetic welding marker, and/or paint crayon and configured to mark the track responsive to the failure of the roller.

20. An aircraft aerodynamic device comprising: a main aerodynamic body; a secondary aerodynamic body; a roller coupled to the main aerodynamic body; a track comprising a coating, connected to the secondary aerodynamic body, configured to be coupled to the roller, and configured to slide by contacting the roller to move the secondary aerodynamic body relative to the main aerodynamic body; and a marker configured to indicate a failure of the roller, the marker comprising a compound and configured to contact the track responsive to the failure of the roller to react with the coating.

* * * * *